April 1, 1969  P. MEYERER  3,436,587
PERMANENT MAGNET SYSTEM FOR THE GENERATION OF A SUBSTANTIALLY
HOMOGENEOUS MAGNETIC FIELD FOR THE BUNDLED GUIDANCE OF AN
ELECTRON BEAM OVER A RELATIVELY LONG PATH, ESPECIALLY
FOR TRAVELING WAVE TUBES
Filed Jan. 21, 1966
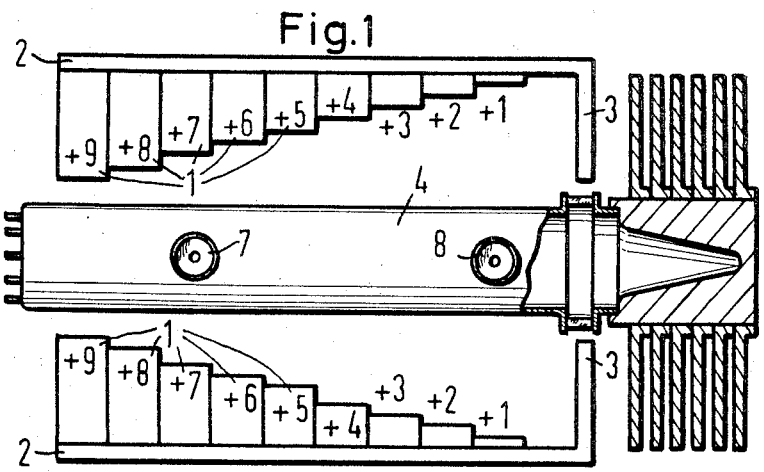
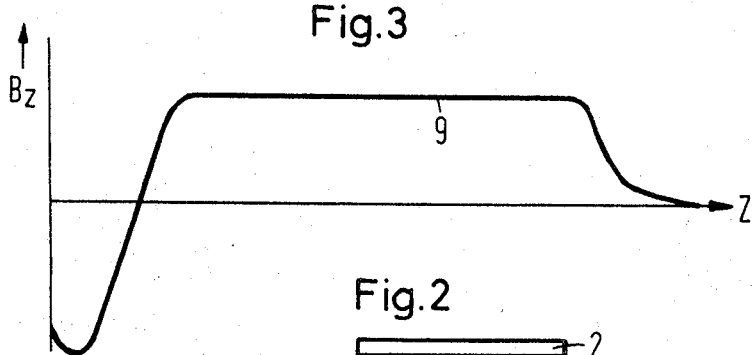
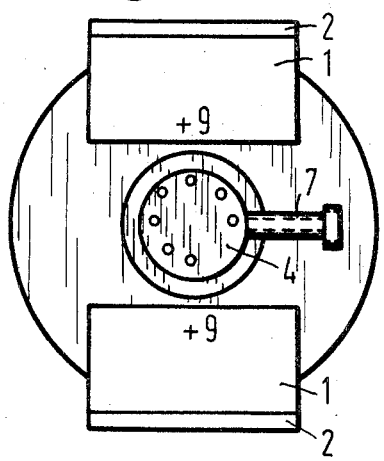
INVENTOR
Paul Meyerer
BY
ATTYS.

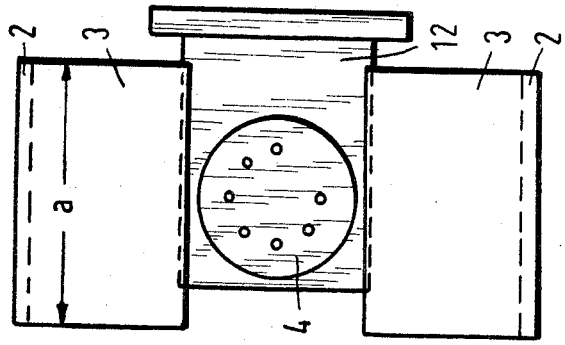
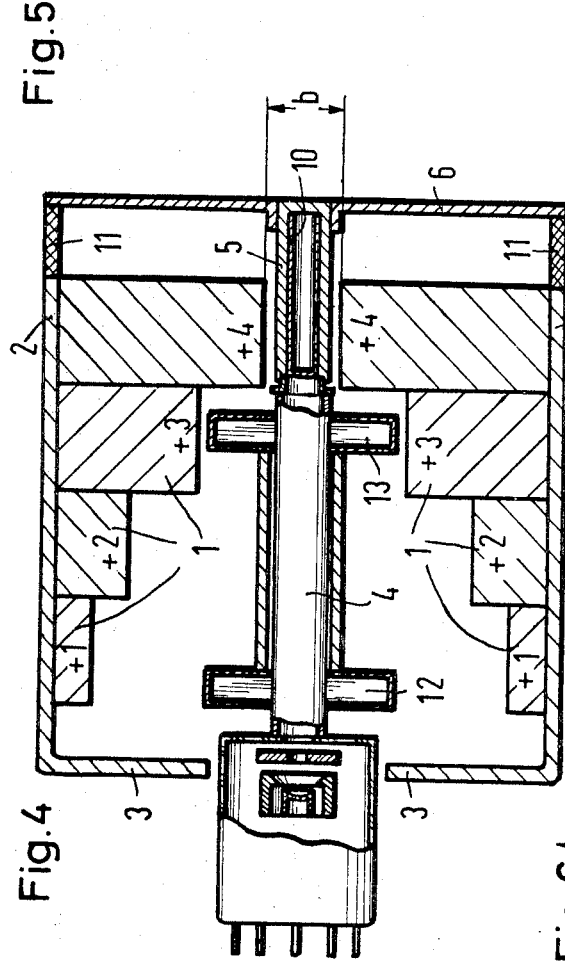
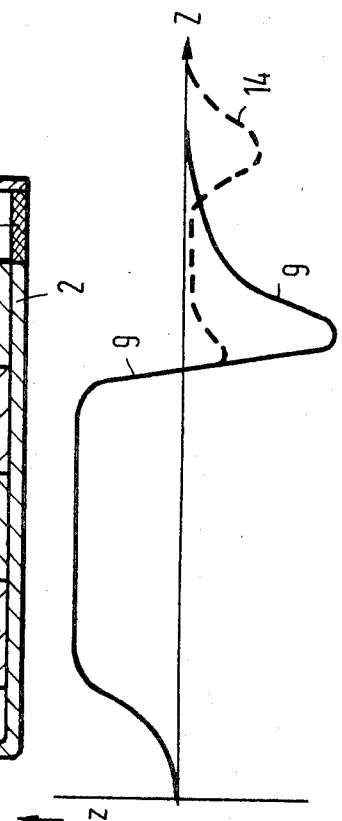

United States Patent Office 3,436,587
Patented Apr. 1, 1969

3,436,587
PERMANENT MAGNET SYSTEM FOR THE GENERATION OF A SUBSTANTIALLY HOMOGENEOUS MAGNETIC FIELD FOR THE BUNDLED GUIDANCE OF AN ELECTRON BEAM OVER A RELATIVELY LONG PATH, ESPECIALLY FOR TRAVELING WAVE TUBES
Paul Meyerer, Ottobrunn, Germany, assignor to Siemens Aktiengesellschaft, Munich, Germany, a corporation of Germany
Filed Jan. 21, 1966, Ser. No. 522,126
Claims priority, application Germany, Jan. 26, 1965, S 95,152
Int. Cl. H01j 25/34
U.S. Cl. 315—3.5                                             6 Claims

ABSTRACT OF THE DISCLOSURE

A traveling wave tube having a series of permanent magnets disposed along the length of the tube, the magnets having decreasing length in a direction perpendicular to the tube axis and a diaphragm formed of magnetically permeable material spaced axially from the adjacent magnet and extending transversely of the tube axis.

---

The invention relates to a permanent magnet system for the generation of substantially homogeneous magnetic field for the bundled guidance of an electron beam over a relatively long path, especially for traveling wave tubes, utilizing permanent magnets arranged symmetrically to the longitudinal axis of the system, which are magnetized perpendicularly to the system axis and are successively disposed in a closed series, one after another, with uniformly charging height in reference to the system axis, in which arrangement the poles of the permanent magnets facing away from the system axis are magnetically shortcircuited by soft iron bridge members.

In electron beam tubes for the amplification or generation of very high frequencies, especially in traveling wave tubes, the electron beam, as is well known, must be conducted in bundled form over a certain path interval. For this purpose there is frequently used a homogeneous magnetic field which is generated by means of a permanent magnet system which surrounds the discharge vessel of the tube.

It is a known practice to construct such magnet systems of permanent magnets which are grouped symmetrically about the longitudinal axis of the system and are magnetized radially to the system axis. The poles of the permanent magnets facing away from the system axis are magnetically connected by soft iron members which extend parallel to the system axis. In such a system it is also a known practice to arrange the magnets next to one another in a closed series, and, particularly, in such a way that the height of the magnets diminishes uniformly relative to the system axis from the two outer ends toward the center of the system. This arrangement presents the advantage that the ratio of the useful magnetic flux to the magnetic scatter flux is very high, so that the magnets can consist of a material which has a low energy content and a very high coercitive force (for example, $H_c > 1500$ oe.). Compact magnets with a small volume therefore may be utilized, which is tantamount to a relatively low magnet weight. An especially low magnet weight is obtained if the permanent magnets consist of hard magnetic ferrites, which, as is well known, represents a magnet material of very high coercitive strength and a low specific weight in comparison to metal alloys.

In the known magnetic system described, with the permanent magnets arranged next to one another, the individual magnets have their greatest length at both face ends of the system, so that the resulting space in which an electron beam tube can be accommodated is limited. In highest-frequency tubes, however, certain parts, such as for example, the electron gun or the electron collector, frequently have a relatively large diameter. The invention therefore has as its problem that of creating a permanent magnet system for the generation of a homogeneous magnetic field for the bundled guidance of an electron beam in highest-frequency tubes, especially traveling wave tubes, which offers, without an appreciable increase of the magnet weight, more latitude in the accommodation of the tube in the magnetic system.

For the solution of such problem there is proposed a permanent magnet system of the type initially mentioned, which is characterized according to the invention by the feature that the permanent magnets decrease in their height from one end face of the magnet system to the other end face thereof, in which arrangement the poles of the permanent magnets facing the system axis are all of the same polarity and that on the end face of the system at which the height of the permanent magnets has decreased to zero, there is arranged a soft magnetic diaphragm or wall which extends from the soft-iron bridge members, perpendicularly to the system axis.

The invention will be explained in detail with the aid of the drawings, wherein like reference characters indicate like or corresponding parts, in which:

FIG. 1 is a side elevational view of a permanent magnet system, according to the invention, with a portion of the traveling wave tube associated therewith broken away;

FIG. 2 is an end elevation of the structure illustrated in FIG. 1;

FIG. 3 illustrates the field course of the permanent magnet system of FIG. 1, and is oriented with respect to the latter, whereby the values illustrated correspond to the respective points along the system axis;

FIG. 4 is a longitudinal section, generally corresponding to FIG. 1, of a modification of the invention;

FIG. 5 is an end elevation of the construction illustrated in FIG. 4; and

FIG. 6 illustrates the field course of the magnetic system of the construction of FIGS. 4 and 5, and is oriented with respect to FIG. 4.

Referring to FIGS. 1 and 2, the reference numeral 1 designates block-shaped permanent magnets which are magnetized perpendicularly to the longitudinal axis of the magnet system and consist preferably of a hard magnetic ferrite of high coercitive strength. The heights of the permanent magnets 1, which are successively arranged in a closed series symmetrically to the longitudinal axis of the system, continuously diminish, in steps relative to the system axis from the one end face of the magnetic system toward its other end. The individual magnet steps, each of which is of like polarity with respect to the adjacent poles along the system axis, have a magnetic potential diminishing uniformly from stage to stage. For the clarification of these potential relations, there appears, in the drawing, in the individual permanent magnets 1, numbers with a positive sign which designates a normalized value of the particular magnetic potential.

The poles of the permanent magnets 1 facing away from the system axis lie in a common plane and are in each case magnetically short-circuited by a soft iron-bridge member 2. The two bridge members 2 are, in each case, bent or otherwise formed at a right angle toward the system axis at the end face of the system at which the height of the permanent magnets 1 has decreased to zero, whereby there is formed a soft magnetic diaphragm or wall 3, which extends perpendicularly and symmetrically to the system axis. The provision of the wall 3 results in the magnetic lines of force, which proceed from the poles of the magnets 1 adjacent to the system axis, forming a homogeneous magnetic field within the magnet system, without the presence of any appreciable scatter flux. Through the action of the homogeneous magnetic field the electron beam of a traveling wave tube 4, which is disposed in the magnetic field, is guided in bundled form. The tube 4 is, in this case, a traveling wave tube for high outputs, in which the electron collector, in the usual manner, is provided with an air cooled structure 5 which has a considerably greater diameter than the remaining discharge vessel of the tube. As a result of the construction of the magnetic system, according to the invention, the dimensions of the cooling structure 5 with the cooling ribs 6 do not have a spatially troublesome effect. Moreover, it is apparent that in the illustrated permanent magnet system according to the invention no difficulties are presented in spatially accommodating the coaxial line connections or terminals 7 and 8 which are required for the coupling and decoupling of the high-frequency energy of the traveling wave tube 4.

Below FIG. 1 there is illustrated in FIG. 3 the field course of a permanent magnet system according to FIGS. 1 and 2, in which the abscissa of the rectangular coordinate system represents the path $z$ in axial direction of the system and the ordinate indicates the magnetic induction $B_z$. The curve 9 represents the value of the magnetic field $B_z$ along the axis of the magnetic system. It will be apparent therefrom that it is only at the end face of the magnetic system at which the permanent magnets 1 have their greatest height relative to the system axis that a reversal of the direction of the magnetic field course exists. On the other hand, the magnetic induction at the end face at which the soft magnetic wall 3 is arranged dies out, without reversal, to zero, which is not the case in the permanent magnetic systems hitherto known. This construction has the special advantage that the collector 5 for the traveling wave tube 4 which, for the purpose of achieving as uniform as possible a distribution of the electrons, should be free of magnetic field over the whole collector wall, does not have to be separately magnetically shielded.

The invention has importance, not only for permanent magnet systems with which the electron beam of a high-output traveling wave tube is to be guided in bundled form but on the contrary, a permanent magnet system according to the invention can also be used to advantage for the bundled conduction of the electron beam of traveling wave tubes having a low high-frequency output, in which the space requirements for the part of the tube containing the electron beam generating system is greater than the space requirements of the electron collector. In this case, the traveling wave tube is so accommodated in a permanent magnet system, according to the invention, that the cathode end of the tube is disposed at that end face of the magnetic system at which the soft magnetic wall 3 is located.

FIGS. 4 and 5 illustrate a corresponding example of construction of the invention. Simultaneously there is represented, partially cut away, a traveling wave tube inserted in such a system for medium or smaller high-frequency powers, which is designated by the reference numeral 4, analogously to FIGS. 1 and 2. As in FIGS. 1 and 2, the block-shaped permanent magnets 1 consisting of hard-magnetic ferrite material are arranged symmetrically to the system axis in two oppositely disposed rows. The adjacently arranged individual magnets 1 are again offset stepwise relative to one another at their ends facing the system axis, while in contrast to FIGS. 1 and 2, the interior space diminishes from the beginning to the end of the system. With respect to the design of the elongated soft iron-bridge members 2 and of the magnetic wall 3, the magnetic system here illustrated corresponds to the system of FIGS. 1 and 2. The collector 5 of the traveling wave tube 4, however, is disposed between the longest permanent magnets 1 arranged along the system axis. The magnetic field existing in the range of the electron collector 4 expediently is largely suppressed by a soft magnetic shielding shell 10, which surrounds the interior space of the collector. The heat loss of collector 5 is radiated from a cooling surface 6 which is mechanically supported by means of non-metallic intermediate pieces 11 which engage the magnetic system. The high-frequency energy is connected to tube 4 over hollow coupling conductors 12 and 13, which again are easily spatially accommodated.

In FIG. 6, positioned below FIG. 4, analogously to FIG. 3, there is plotted the magnetic field course $B_z$ over the length $z$ of the magnet system. The solidly drawn curve 9 for the course of $B_z$ over the interval $z$ is applicable, in the absence of the traveling wave tube 4, while the field course 14 drawn in broken lines is applicable with the presence of the magnetic shielding 10 of the collector 4.

The separation between the two longest permanent magnets 1 arranged at the end face of the system, designated in FIG. 4 as $b$) as in the permanent magnet systems already known, should be as small as possible, so that the ratio of the magnetic scatter flux to the magnetic useful flux, and thereby the magnet weight, can be kept very low. It is preferred that the ratio of the distance $b$ to the width of the permanent magnets transversely to the longitudinal axis of the system (designated as $a$ in FIG. 5) be equal to or smaller than one quarter. With such a ratio of $b/a \geq \frac{1}{4}$ it is possible with a magnet system according to FIGS. 1 and 2, or 4 and 5, with a low magnet weight, to achieve a magnetic induction on the axis of the magnet system up to 900 g. The measure of there providing merely two symmetrically facing rows of permanent magnets has, in addition, the advantage that, in any case, sufficient space is available to accommodate the hollow conductors or coxial line connections for effecting the coupling and decoupling of the high-frequency energy.

The invention is not restricted to the examples of construction illustrated. In particular, it also is possible to arrange four permanent magnets in a star-shaped configuration about the system axis in a plane perpendicular to the longitudinal axis of the magnet weight, so that there result four closed rows of permanent magnets. The permanent magnets may in certain cases also be of annular form, particularly when it presents no difficulties in the accommodation spatially of the high frequency coupling and decoupling connections of a traveling wave tube.

Changes may be made within the scope and spirit of the appended claims which define what is believed to be new and desired to have protected by Letters Patent.

I claim:

1. A permanent magnet system for the generation of a substantially homogeneous magnetic field for the bundled guidance of an electron beam over a relatively long path interval, particularly for a traveling wave tube, having a cathode and a collector and a beam path therebetween comprising a plurality of permanent magnets arranged symmetrically to the longitudinal axis of the system, said magnets being magnetized perpendicularly with respect to the system axis, with such magnets varying in height relative to the system axis, soft iron bridge members disposed at the respective poles of the permanent magnets facing away from the system axis magnetically connecting such poles, said permanent magnets successively decreasing in radical height in a closed row from one end of the system to the other end thereof, the magnetic poles of said magnets facing the system axis being of like polarity, and a soft magnetic diaphragm, attached to said soft iron bridge members at the end of the system at which the height of the permanent magnets has been reduced to a minimum and extending perpendicularly from said soft iron bridge members toward the system axis, said soft magnetic diaphragm being axially spaced from the adjacent one of said plurality of permanent magnets.

2. A permanent magnet system according to claim 1, wherein the permanent magnets consist of hard magnetic ferrite material.

3. A permanent magnet system according to claim 2, wherein the permanent magnets are of block form, the individual magnets adjacently arranged being offset stepwise with respect to one another at their ends facing the system axis, while their outer ends are disposed in alignment.

4. A permanent magnet system according to claim 3, wherein the permanent magnets are arranged in two opposite rows disposed symmetrically to the system axis.

5. A permanent magnet system according to claim 4, wherein the ratio of the distance separating the two longest permanent magnets arranged at the one end of the system to the width of the permanent magnets transversely to the longitudinal axis of the system, is equal to or less than one-fourth.

6. A traveling wave tube with a permanent magnet system according to claim 1 wherein the cathode end of the tube is disposed at the end face of the magnet system at which the soft magnetic diaphragm is arranged, while the collector of the tube is disposed between the permanent magnets arranged on the other end of the magnet system, such collector being provided with a soft magnetic shielding shell.

References Cited

UNITED STATES PATENTS

| 2,741,718 | 4/1956 | Wang | 315—3.5 |
| 2,867,744 | 1/1959 | Kompfner | 315—3.5 |
| 2,956,193 | 10/1960 | De Wit | 315—3.5 X |
| 3,141,116 | 7/1964 | Henne | 335—210 |
| 3,237,059 | 2/1966 | Meyerer | 315—3.5 X |

FOREIGN PATENTS

| 1,329,084 | 4/1963 | France. |
| 951,851 | 3/1964 | Great Britain. |

HERMAN KARL SAALBACH, *Primary Examiner.*

SAXFIELD CHATMON, JR., *Assistant Examiner.*

U.S. Cl. X.R.

335—210; 313—84